United States Patent
Leggatt et al.

(10) Patent No.: US 8,150,754 B2
(45) Date of Patent: Apr. 3, 2012

(54) METHODS, APPARATUS AND COMPUTER PROGRAM PRODUCTS FOR INTERFACING AUTOMATIC BILL PAYMENT SYSTEMS WITH CARD ISSUER DATABASE SYSTEMS

(75) Inventors: Lesley Leggatt, Glendale, AZ (US); Leigh R. Malnati, Mountain Lakes, NJ (US); Danielle Nulle, Atlantic Highlands, NJ (US); Ursula Winter, Valley Stream, NY (US); Jeannine Haas, Ridgewood, NJ (US); Cecilia Sun, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 409 days.

(21) Appl. No.: 12/342,601

(22) Filed: Dec. 23, 2008

(65) Prior Publication Data

US 2010/0161484 A1    Jun. 24, 2010

(51) Int. Cl.
*G06Q 40/00* (2012.01)
(52) U.S. Cl. ........................... 705/36 R; 705/39
(58) Field of Classification Search ............... 705/36 R
See application file for complete search history.

(56) References Cited

U.S. PATENT DOCUMENTS

| | | | |
|---|---|---|---|
| 5,283,829 A | 2/1994 | Anderson | |
| 5,383,113 A | 1/1995 | Kight et al. | |
| 6,298,335 B1 | 10/2001 | Bernstein | |
| 6,678,664 B1 | 1/2004 | Ganesan | |
| 7,107,243 B1 | 9/2006 | McDonald et al. | |
| 7,123,698 B1 | 10/2006 | Clifford et al. | |
| 7,249,098 B2 | 7/2007 | Milberger et al. | |
| 7,295,999 B1 | 11/2007 | Simon et al. | |
| 7,467,109 B1 | 12/2008 | Simon et al. | |
| 7,526,448 B2 * | 4/2009 | Zielke et al. | 705/40 |
| 2005/0192901 A1 * | 9/2005 | McCoy et al. | 705/40 |

\* cited by examiner

*Primary Examiner* — Jason M Borlinghaus
(74) *Attorney, Agent, or Firm* — Snell & Wilmer L.L.P.

(57) ABSTRACT

An interface for interfacing a merchant processor with a card issuer database receives a merchant profile including transaction request data elements and stores the merchant profile in a global merchant database. A request for data corresponding to at least one element of the merchant profile is transmitted to a merchant system and/or a cardmember database. Data corresponding to the merchant profile is received from the merchant system and/or the cardmember database and stored in the global merchant database. A marketing system is notified that at least one record associated with the merchant profile is stored in the global merchant database.

20 Claims, 6 Drawing Sheets

METHODS, APPARATUS AND COMPUTER PROGRAM PRODUCTS FOR INTERFACING AUTOMATIC BILL PAYMENT SYSTEMS WITH CARD ISSUER DATABASE SYSTEMS

BACKGROUND OF THE INVENTION

1. Field of the Invention

The present invention generally relates to automatic bill payment systems, and more particularly to a system and method for interfacing merchant payment processing systems, card issuer databases, and marketing systems, and the creation of a merchant database including aggregated merchant and cardmember data for performing automatic bill payments.

2. Related Art

Late payments can slow down a merchant cash flow, and collecting back payments can be costly. An automatic bill payment service (also referred to as recurring payment service) can speed up the payment process and improve customer retention with the merchant. It allows customers with recurring charges to pay the merchant automatically with a financial transaction card selected by the user. It is convenient for the customer and helps the merchant get paid on time. As a result, no late notices need to be sent or phone reminders need to be made.

By setting up automatic bill payment services, customers do not have to worry about writing checks, late charges, or missed payments—even when they are away from home. In addition, customers using transaction cards enrolled in rewards programs earn miles, points, or cash back each time a bill is automatically paid.

Customers typically set up automatic bill payments through a merchant's bill pay webpage by logging onto a URL or through the merchant's customer service centers by calling a customer-service number of the merchant. After several pieces of information are input, the customer is enrolled.

Another technique has been to retrieve and disseminate information records from Internet sources. Such systems read the configuration settings of an existing bill pay service, such as payee information (electronic and paper), scheduled and automatic payments, and e-bill configurations. An application then guides a consumer through the completion of the payee set up process at the new bill pay service, auto-filling all available biller information and payment profiles. This application can be run from a service provider other than the merchant.

Merchant automatic bill payment data and cardmember transaction account data are stored in distinct databases. In some systems, cardmember transaction account data and marketing data are stored in distinct databases as well. As a result, various applications within the automatic bill payment, transaction account and marketing systems do not share a common or consistent interface, and the process of setting up an automatic payment service with a merchant remain cumbersome and time-consuming. In many cases, existing multi-step processes for setting up this type of service discourages customers from even signing up.

Moreover, it is difficult, if not impossible, to identify cardmembers who also receive services from merchants who provide automatic bill payment services thus driving marketing costs higher. In addition, without such interfacing, card issuers who are partnered with merchants offering automatic bill payment services are still at risk of their cardmembers setting up automatic bill payments with competitor transaction accounts. Given the foregoing, what is needed is a system, method and computer program product which leverages merchant and cardmember information to improve efficiency and customer/merchant satisfaction associated with automatic bill payment services.

BRIEF DESCRIPTION OF THE INVENTION

The present invention meets the above-identified needs by providing a system, method and computer program product for interfacing automatic bill payment systems with card issuer database systems.

In one embodiment a method and computer readable medium are provided for interfacing a merchant processor with a card issuer database which provide receiving a merchant profile including transaction request data elements and storing the merchant profile in a global merchant database. A request for data corresponding to at least one element of the merchant profile is transmitted to a merchant system and/or a cardmember database. Data corresponding to the merchant profile is received from the merchant system and/or the cardmember database and stored in the global merchant database. A marketing system is notified that at least one record associated with the merchant profile is stored in the global merchant database.

In another embodiment, a decisioning apparatus for integrating a merchant processor with a card issuer database is provided. The decisioning apparatus includes a merchant logic unit configured to receive a merchant profile including transaction request data elements, store the merchant profile in a global merchant database, and to transmit to a merchant system a first request for data corresponding to at least one element of the merchant profile. The decisioning apparatus also includes a cardmember database logic unit configured to transmit to a cardmember account database a second request for data corresponding to at least one element of the merchant profile. The merchant logic unit and the cardmember database are further configured to receive data corresponding to the merchant profile from the merchant system and the cardmember database, and store the data in the global merchant database. A marketing logic unit configured to notify a marketing system that at least one record associated with the merchant profile is stored in the global merchant database also is included.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION

The present invention is directed to a system, method and computer program product for interfacing automatic bill payment systems with card issuer database systems.

The terms "user," "end user," "consumer," "customer," "participant," "cardmember," and/or the plural form of these terms are used interchangeably throughout herein to refer to those persons or entities capable of accessing, using, being affected by and/or benefiting from the present invention.

Furthermore, the terms "business," "merchant," or "service establishment (SE)," may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A "transaction account" as used herein refers to an account associated with an open account or a closed account system. The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A "card issuer" and "issuer" as used herein refer to an organization that issues a transaction account and associated financial instrument (e.g., payment device, transaction card, and the like) to a cardmember. They also are responsible for maintaining details of the cardmember's account including eligibility for services, payments made, charges incurred, and the like.

"Open cards" are financial transaction cards that are generally accepted at different merchants. Examples of open cards include the American Express®, Visa®, MasterCard® and Discover cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Figure 1:
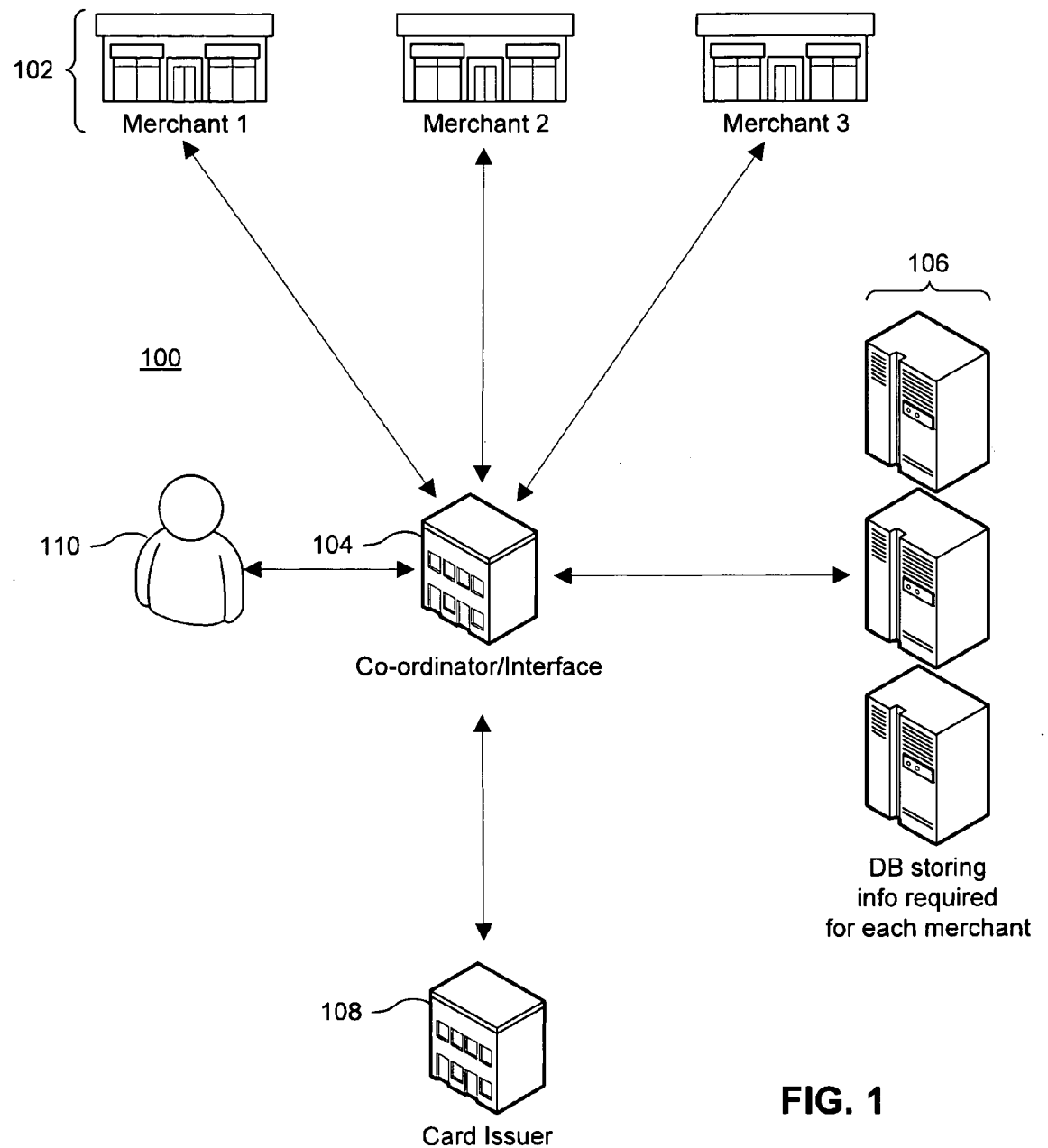
FIG. 1 is a system diagram of an exemplary automatic payment system in accordance with an embodiment of the present invention.

FIG. 1 is a system diagram of an exemplary automatic payment system 100 in accordance with an embodiment of the present invention. System 100 includes merchant systems 102, a co-ordinator/interface 104, a global merchant database 106 and a card issuer system 108. Using their respective bill processors, merchant systems 102 generate transaction requests to collect customer payments. These transaction requests are transmitted to transaction processors corresponding to the particular transaction account used to affect bill payments. Accordingly, the bill processing may be communicated between the merchant system 102, the card issuer 108 and/or a third party transaction processor (not shown).

Co-ordinator/interface 104 requests and receives information required by each merchant's bill processor to implement automatic payments. This information is stored in cardmember records on global merchant database 106 which is accessible by the bill processors of merchants 102 in accordance with their access privileges. Customer information is retrieved from merchant databases managed by the individual merchants and cardmember transaction account information is retrieved from cardmember databases managed by card issuer 108.

Alternatively, global merchant database 106 is internal to either the card issuer system 108 or a third party (not shown) and the co-ordinator/interface 104 pushes information to merchant systems 102. Thus, the data stores of the global merchant database 106 are not freely accessible to the operators of merchant systems 102. As will be explained below in more detail with respect to FIG. 2, profiles stored in global merchant database 106 determine what information a cardmember 110 or card issuer system 108 needs to supply to complete a record.

In some cases, a cardmember record (i.e., from a cardmember account database) matches a merchant customer record (i.e., from a merchant database), but both records combined are still insufficient for the merchant bill processor to generate a transaction request to receive a payment. Even so, the amount of information a cardmember/customer needs to fill in to complete an automatic bill payment request is reduced had the data not been aggregated by co-ordinator/interface 104.

Figure 2:
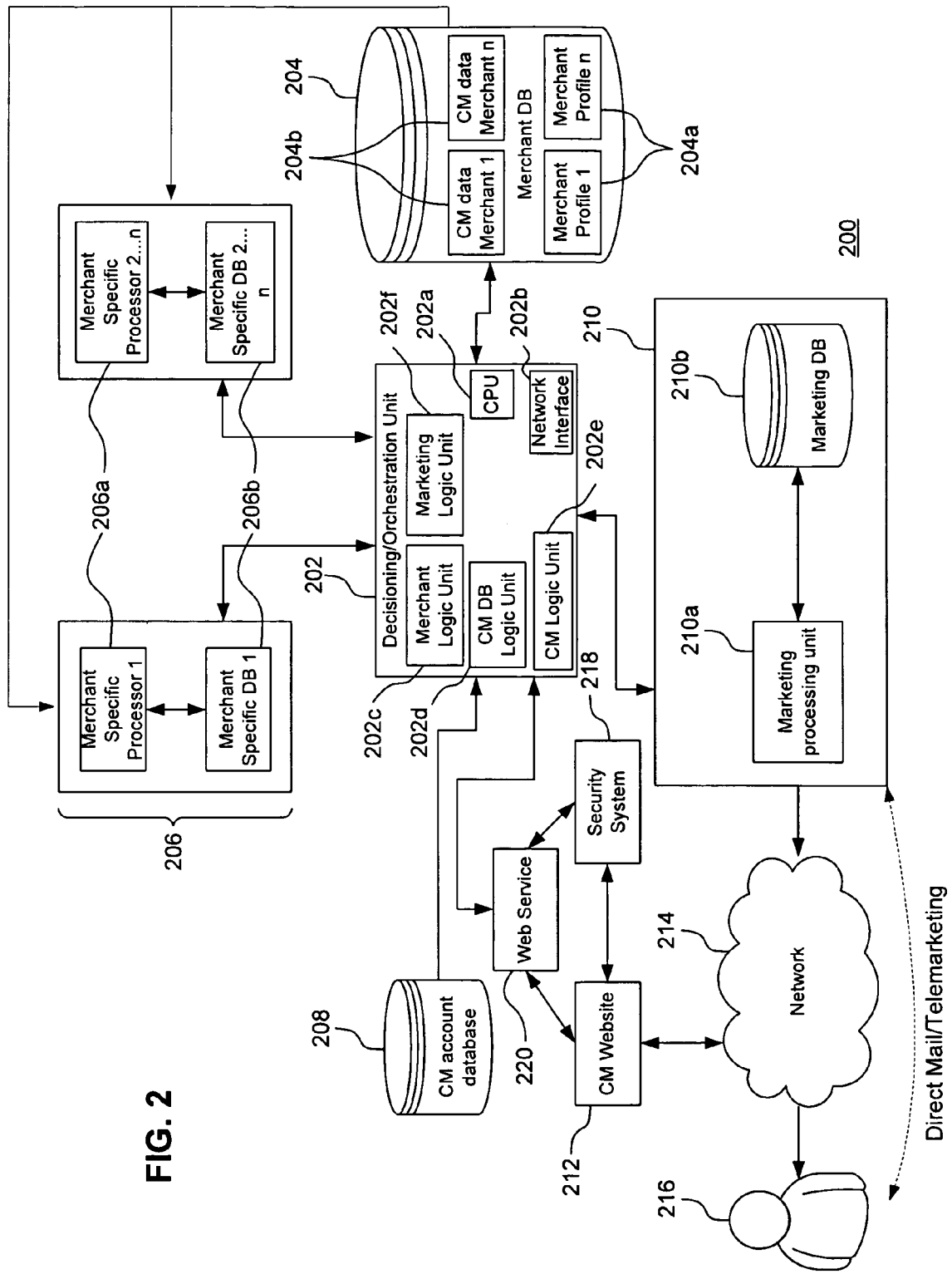
FIG. 2 is a collaboration diagram of functional modules deployed on one or more computer systems for implementing automatic bill payments in accordance with an embodiment of the present invention.

FIG. 2 is a collaboration diagram of functional modules deployed on one or more computer systems for implementing bill payments in accordance with an embodiment of the present invention. In one embodiment, a decisioning/orchestration unit 202 includes a processor ("CPU") 202a, a network interface 202b, a merchant logic unit 202c, a cardmember ("CM") database ("DB") logic unit 202d, and an CM logic unit 202e constructed to receive information from merchant systems 206, cardmember account database 208, and a cardmember (via a user interface of a web service) and to input this information in corresponding cardmember records 204b (i.e., cardmember data—Merchant 1 . . . n) stored in a global merchant database 204. In addition, marketing logic unit 202f controls operations between marketing system 210 and decisioning/orchestration unit 202.

Particularly, the merchant logic unit 202c controls communications between the decisioning/orchestration unit 202 and merchant systems 206 and performs associated processing, CM DB logic unit 202d controls communications between decisioning/orchestration unit 202 and cardmember account database 208 and performs associated processing, and CM logic unit controls communications between decisioning/orchestration unit 202 and a cardmember and performs associated processing. Communications are performed through the network interface 202b. A CPU 202a controls the overall functions of the decisioning/orchestration unit 202 as described below with respect to FIGS. 3, 4A and 4B. CPU 202a also controls communications between global merchant database 204 and decisioning/orchestration unit 202.

Figure 5:
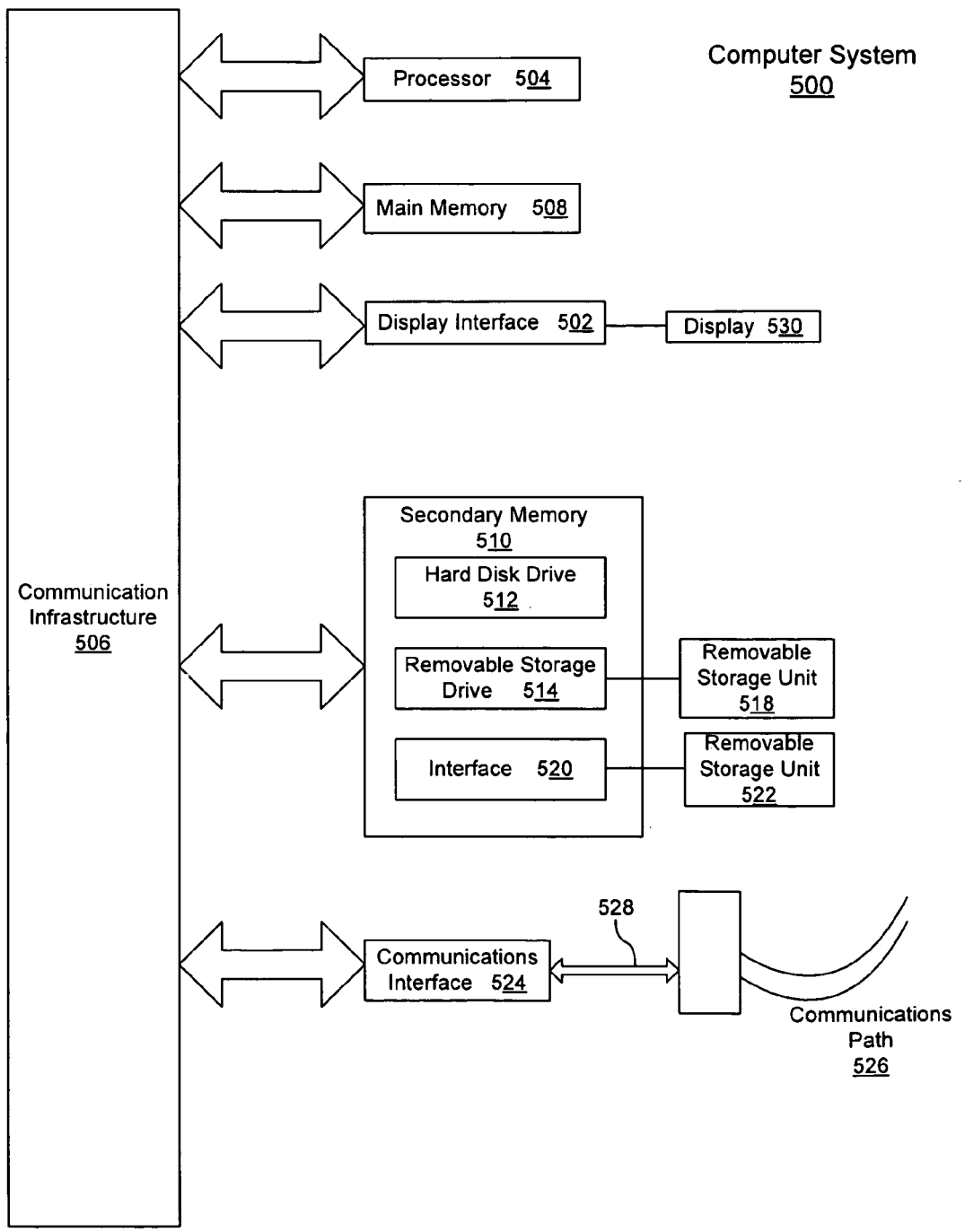
FIG. 5 is a block diagram of an exemplary computer system useful for implementing the present invention.

The individual logic units of decisioning/orchestration unit 202 may be implemented in one or more computer systems or other processing systems as described below with respect to FIG. 5. In addition, global merchant database 204 can be operated and controlled by the card issuer system, a third party system, or a combination of both. In addition, if provided access, merchant systems 206 can control certain information stored on global merchant database 204 in accordance with their access rights. For example, should a merchant require an additional data element in order to process a transaction request, a format modification in merchant system 206 has been implemented, and the like, needs to be modified on global merchant database 204, if access has been granted, the merchant can modify this information. If such access has not been granted to a merchant system 206, then the merchant system communicates a request to decisioning/orchestration unit 202 (e.g., through merchant logic unit 202c) to make a change in global merchant database 204. In turn, decisioning/orchestration unit 202 makes the change if appropriate.

The particular data elements retrieved from merchant specific database 206b are defined in a corresponding merchant profile 204a (i.e., Merchant profile 1 . . . n) also stored in global merchant database 204. Decisioning/orchestration unit 202 also requests cardmember transaction account information from a cardmember account database 208 and stores it in corresponding cardmember records 204b.

In an embodiment, decisioning/orchestration unit 202 retrieves merchant customer information from the merchant and before storing the information in cardmember records 204b, it checks whether any of the merchant's customers are also cardmembers of the card issuer. This can be accomplished by, for example, matching customer records with cardmember records by last name along with other information from the records if necessary. Should a match exist, then the cardmember/customer information is stored in an individually indexed cardmember record 204b in global merchant database 204.

In another embodiment, a list of cardmembers taken from a cardmember database are compared against the merchant databases. Likewise should the list of cardmembers match the merchant database records, then the cardmember/customer information is stored in cardmember records 204b stored in global merchant database 204.

In yet another embodiment, initially, only data retrieved from a merchant specific database 206b is stored in cardmember records 204b and only if a cardmember accepts an invitation to set up automatic bill payments is that cardmember's transaction account information stored on cardmember account database 208 imported to a corresponding cardmember record 204b in global merchant database 204.

If cardmember records 204b contain data sufficient to configure an automatic bill payment by a merchant processor 206a, this data is then made accessible to merchant processors 206a according to their access privileges. For example, a telephone services provider will have access to cardmember data associated with just that telephone service provider, while a cable television service provider will have access to cardmember data associated with just the cable service provider. Transaction account information provided by cardmember account database 208 can be processed to be unique for each merchant. For example, instead of providing each merchant a cardmember's underlying account number, a proxy number can be stored in each cardmember record. The merchant specific processor 206a incorporates the proxy number in its transaction request, which is matched to the cardmember account downstream by a transaction processor (not shown), providing added account security.

Should cardmember records 204b contain insufficient data to configure an automatic bill payment, then during the automatic bill pay set up process involving the participant (i.e., cardmember 216), the participant is requested to enter the missing information.

As described above, with respect to FIG. 1, global merchant database is internal to either the card issuer system or a third party and the co-ordinator/interface pushes information to merchant systems. Referring to FIG. 2, this is accomplished using merchant profiles 204a to request information missing from cardmember data records 204b. Decisioning/orchestration unit 202 requests missing information from either cardmember account database 208 or cardmember 216 (e.g., through web service 220 and cardmember website 212). In this embodiment a merchant system 206 may, for example, provide the card issuer system (e.g., card issuer system 108) with a list of its customers and card issuer system may match merchant 206 customers who are also cardmembers. Should a cardmember decide to setup automatic bill payments, decisioning/orchestration unit 202 would push data from global merchant database 204 to the particular merchant. Thus, the card issuer system controls the cardmember information merchant 206 receives and does not make its database freely accessible.

Differences in record elements (e.g., first names Joe vs. Joseph) retrieved from merchant specific databases 206b and cardmember account database 208 can be reconciled by decision/orchestration unit 202. This reconciliation can be accomplished by comparing the records retrieved from a merchant to cardmember account records retrieved from the card issuer. Alternatively, the cardmember records 204b associated with distinct merchants can be compared. For example, decision/orchestration unit 202, can confirm that the cardmember associated with one service is the same as the cardmember associated with another service and correct the cardmember records 204b without making further requests to either cardmember account database 208 or merchants 206. In yet another embodiment, during the automatic bill set up process, the participant can be asked to correct the record information.

A marketing system 210 including a marketing processing unit 210a and a marketing database 210b also have access to global merchant database 204. In one embodiment, marketing processing unit 210a determines which cardmembers receive services from merchant systems 206 and which ones are not set up for automatic bill payments with those merchants. If a cardmember who also receives services from a merchant 206 is not set up for such automatic bill payments, marketing decision processing unit 210a receives marketing information from marketing database 210b and forwards this information through a network 214 to a cardmember 216 via a cardmember website 212.

Instead of communicating the marketing information through network 214, marketing system 210 can cause mailers with similar information to be sent to the cardmembers through direct marketing channels. Alternatively, telemarketing may be used to communicate a request or offer to set up automatic payments to pay for services provided by one or more merchants.

A security system 218 is provided to check website privileges and make a call to a web service 220, which in turn retrieves cardmember eligibility data. This eligibility data can also be stored in global merchant database 204.

Decisioning/orchestration unit 202 can also determine whether the cardmember has set up automatic bill payments or is simply paying each bill on a case by case basis (i.e., "pushing" payments). One way this is accomplished is by including in each merchant profile 204a a record data element that indicates whether automatic bill payment have been set up. The merchant system 206 would provide this data to decisioning/orchestration unit 202, which in turn populates this record data element.

A cardmember may set up their account with a merchant for automatic payments by signing onto a secure webpage to view their account information. In an exemplary embodiment, this secure webpage is hosted by the card issuer through a network 214. The cardmember provides authentication information and, once authenticated, has the option to enroll in a automatic bill payment service. If the cardmember record for the merchant is complete, no additional information from the cardmember is required after the user is authenticated.

In another exemplary embodiment, the cardmember receives a communication providing them with a URL to connect to, or telephone number to call. Upon verifying that the user is the intended recipient of the communication, the cardmember is permitted to enroll in automatic bill payments associated with the communication with little or no additional information.

For example, a link (e.g., hyperlink) may be displayed on a website such as the card issuer website, or in an email, which upon being selected directs a web browser to an automatic bill payment enrollment screen. The link itself may contain additional information identifying the cardmember that is verified by, for example, security system 218 by matching the information to information stored in a database (e.g., CM account database 208 or Merchant DB 204).

In one example, the card issuer has a relationship with a merchant (i.e., biller). Upon authentication, the card issuer sends cardmember enrollment information to merchant system 206 which, in turn, sets up the automatic bill payments. The cardmember may be asked to provide predefined information necessary to enroll the cardmember in an automatic bill payment plan (e.g., name, card number, reference number, etc.). This information is sent to merchant system 206. Merchant system 206, in turn, matches the predefined information to information stored in its database (e.g., merchant specific DB 206*b*) and sets up the cardmember for automatic bill payments.

Alternatively, the cardmember may receive an email (or message through a website) from marketing unit 202*f*, requesting the cardmember to select a hyperlink or sign onto a website (e.g., CM Website 212). Selecting a hyperlink in the email or website (e.g., "enroll me" button) causes decisioning/orchestration unit 202 to automatically sign up the cardmember for automatic bill payments. The cardmember may then be requested to enter predefined information necessary to sign up for automatic billing (e.g., name, card number, reference number, etc.). Upon matching predefined information with, for example, information in a cardmember account.

It should be understood that authentication can be performed by different entities. In other words, cardmember authentication information can be verified by either the card issuer, merchant, or a third party system by, for example, matching the predefined information provided by the cardmember with information stored in a database. The particular database can be a card issuer database (e.g., CM account database), merchant database (e.g., merchant specific database 206*b*), third party system (not shown), Merchant DB 204, or a combination of these databases.

In an alternative embodiment, the cardmember may contact the card issuer to enroll the cardmember in the automatic bill payment program by leaving a message with the card issuer. The card issuer or an affiliate of the card issuer can then follow up on the request with the cardmember via telephone, direct mail, email and the like. In a variant of this embodiment, the cardmember can select a hyperlink (either from a webpage through CM Website 212 and Web service 220, or embedded in an email) which causes a message to be built and sent to the card issuer (or third party administrator). The message provides the issuer with information about the cardmember.

The cardmember may be prompted to enter contact information (e.g., telephone number) which is then communicated to the card issuer. Additional information may be requested of the cardmember as well (e.g., times the cardmember can be reached, etc.). Thus, a cardmember may request the card issuer (or a third party administrator) to contact the cardmember either by email or telephone.

Advantageously the above-described enrollment techniques provide the card issuer, merchant, or third party administrator, the ability to avoid at least some steps related to enrolling a cardmember in the automatic bill payment program.

Figure 3:
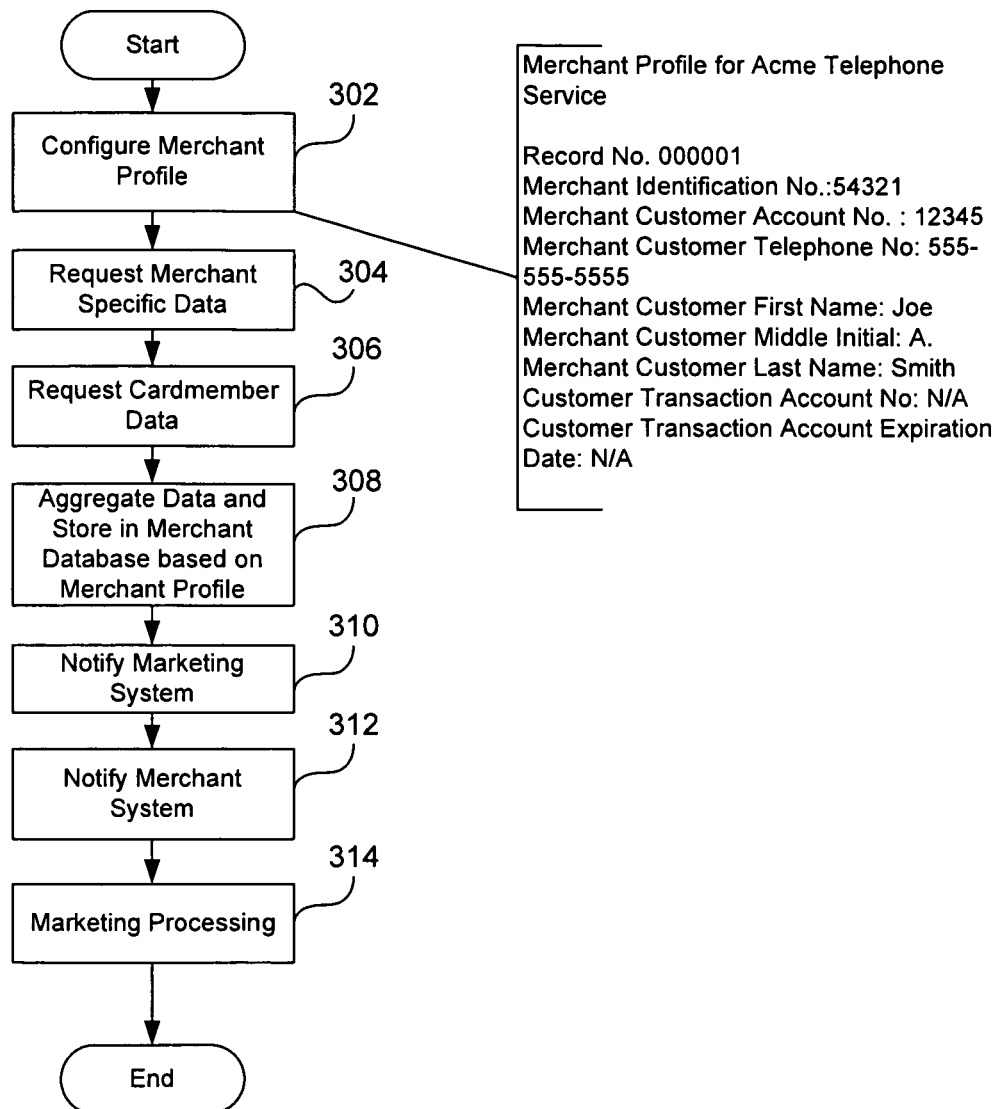
FIG. 3 is a flowchart illustrating a data aggregation process in accordance with an embodiment of the present invention.

FIG. 3 is a flowchart illustrating a merchant database configuration procedure 300, according to one embodiment of the present invention. Process 300 begins at block 302 in which a merchant profile is configured. This profile is unique to the merchant. Particularly, the merchant profile includes customer information necessary to generate a transaction request that a particular merchant will transmit to a card processor to effect a payment. This block is performed by the merchant logic unit 202*c*.

An exemplary merchant profile is shown in FIG. 3 (block 302). In this example, the merchant profile is for a telephone service and is incomplete. The merchant profile includes a merchant identification number, merchant customer account number, merchant customer telephone number, merchant customer name, as well as information about the customer's transaction account (e.g., credit card number) the transaction account processor needs to process the transaction request.

Referring also to FIG. 2, a merchant profile 204*a* is stored in global merchant database 204. Once the merchant profile is configured, decisioning/orchestration unit 202 requests data from both the merchant system 206 and the cardmember account database 208 to fill in cardmember records 204*b* corresponding to the merchant, as shown at blocks 304 and 306. At block 308, decisioning/orchestration unit 202 aggregates the data it receives back from merchant system 206 and cardmember account database 208 and stores this information in cardmember records 204*b* based on the respective merchant profiles 204*a*. Upon completion of a cardmember record (or after a group of records have been filled as much as possible), decisioning/orchestration unit 202 notifies both the marketing and merchant systems (210, 206) that the records are ready (or as filled-in as possible), as shown at blocks 310 and 312.

In an embodiment, at block 314, the records are processed by marketing system 210. For example, marketing system 210 in cooperation with decisioning/orchestration unit 202 process the cardmember data to determine which cardmembers are not enrolled in automatic bill payments with the issuer's partnered merchants. Once identified, marketing system 210 communicates offers to cardmembers to sign up for automatic bill payments using much simplified setup procedure. As explained above, this can be performed by checking a cardmember record element in cardmember record 204*b* for a value indicating whether a cardmember is enrolled in such a service. In one embodiment, this information comes from the merchant.

In one embodiment, the global merchant database is made accessible to merchants (e.g., upon notification by the entity controlling the database). In another embodiment, upon a request to setup automatic bill payments, the cardmember data stored in global merchant database is pushed to the merchants. Particularly, the cardmember data associated with a merchant profile is transmitted to a merchant system so that it can store this information in order to process automatic payments from its end. This allows the entity controlling (and pushing) the datastores to control the data but not process transaction requests associated with the automatic payments.

Figure 4:
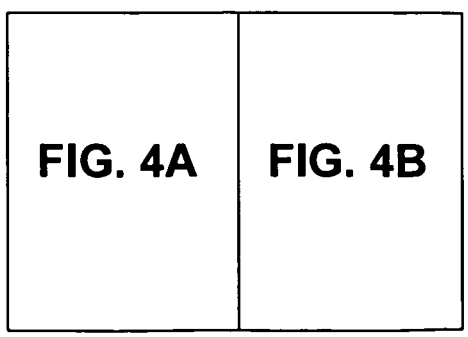
FIGS. 4A and 4B are a flowchart illustrating a cardmember bill payment setup process according to one embodiment of the present invention.
Figure 4A:
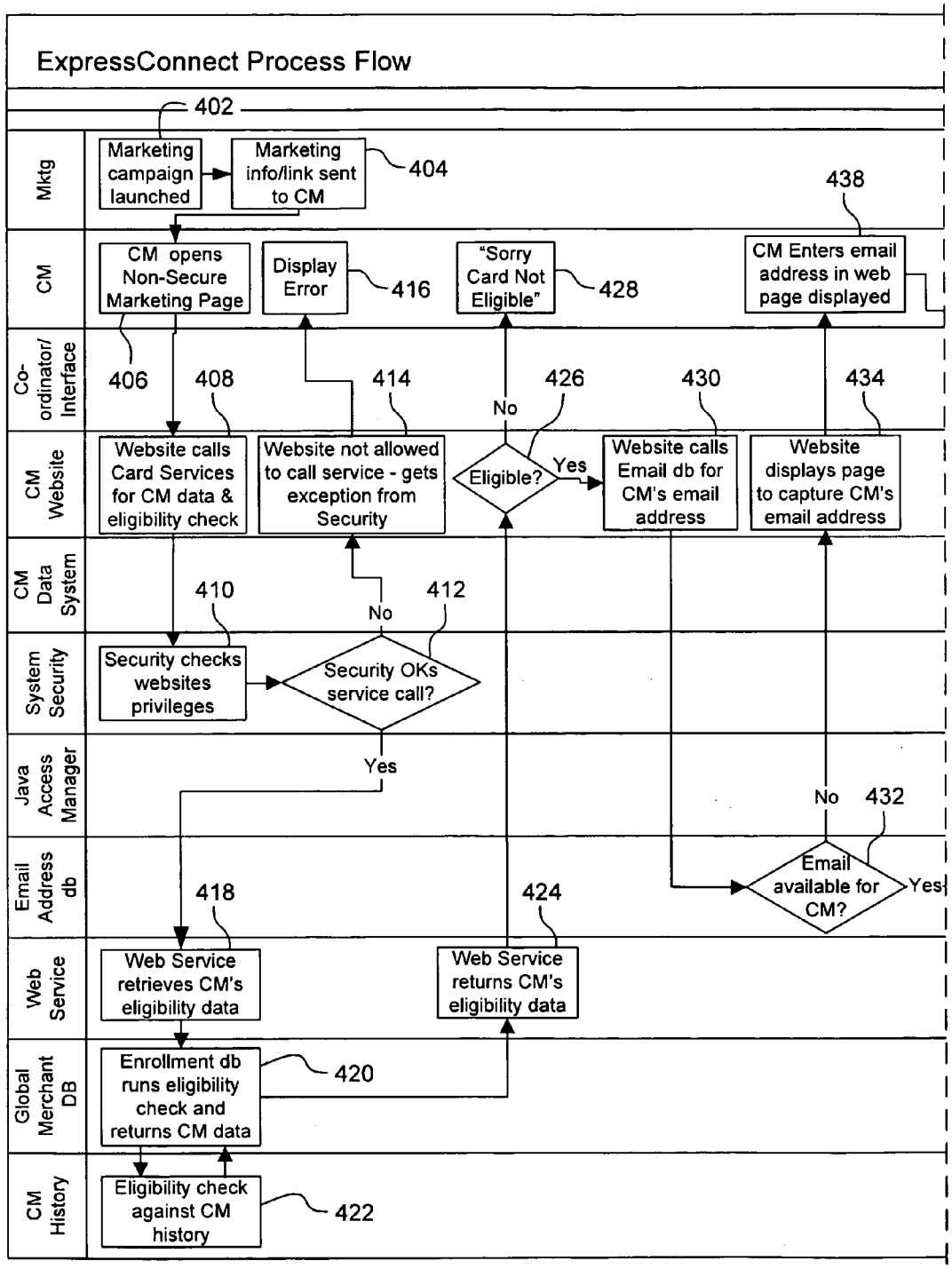
Figure 4B:
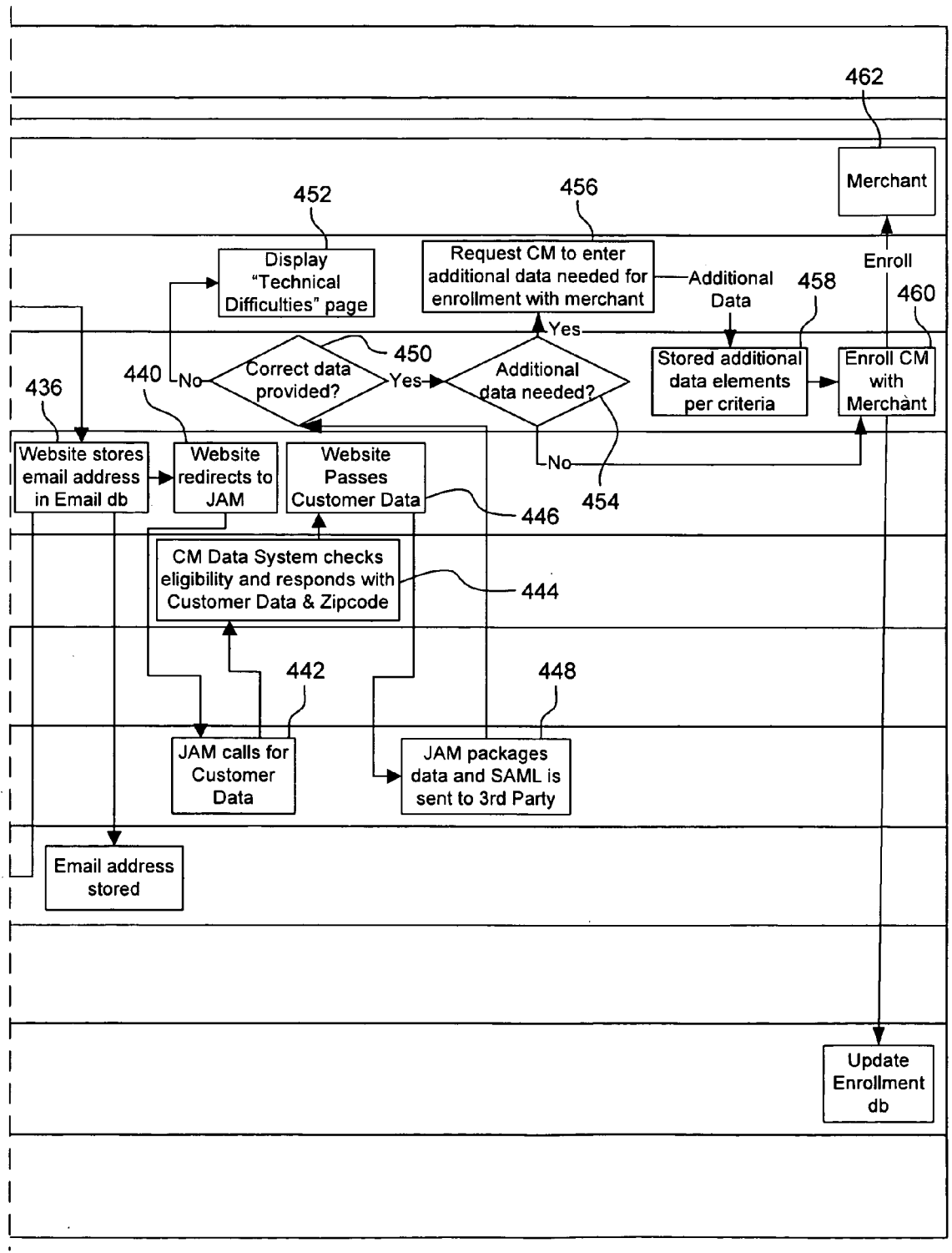

FIGS. 4A and 4B are a flowchart illustrating an automatic payment configuration procedure 400, according to one embodiment of the present invention. Generally, procedure 400 involves a process for signing up a bill for automatic payments with a minimal amount of data from a cardmember.

Additional required information is then provided by either the card issuer (e.g., from cardmember database 208) or merchant (e.g., from its merchant specific database 206b).

Because a direct connection between a merchant system and the merchant database exists, both the merchant and card issuer can minimize the amount of data they need to collect from a cardmember (or authorized merchant representative). In order to set up his or her automatic bill payments, preferably, a cardmember need only provide one or two pieces of information, such as a card security code (CID) (e.g., the four (4) digit number on the right hand side of a transaction instrument) and/or the last four digit of the cardmember's social security number. It should be understood, of course, that such information is not limited to these examples and that other identifying information—whether conventional or as may be practical in the future—can be used instead (e.g., biometric identifiers such as voice, fingerprint, retinal scan, and the like).

In some cases, it may be required that the customer provide non-identifying information that typically is stored in either the merchant specific database 206b or cardmember database 208. This may occur for example, if the information between these databases does not reconcile. For example, when the last name stored in one database is the cardmember's maiden name but is the cardmember's married name in the other, the cardmember may be asked to enter their last name.

Process 400 begins at block 402 with marketing system 210 launching a marketing campaign directed towards cardmembers who also receive services from partnered merchants 206. Particularly, marketing system 210 sends marketing information such as a URL to a cardmember 216 over a network 214 or via direct mail marketing as shown in block 404. At block 406, cardmember 216 opens the marketing page on cardmember website 212.

At block 408 cardmember website 212 communicates a request to web service 220 to perform an eligibility check of the cardmember based on the cardmember data associated with the website call. In one embodiment, this initial marketing page is not secure. Before the call reaches web service 220, at block 410, security system 218 performs a security check to determine the cardmember website privileges and whether the website is authorized to make a service call to web service 220. If a determination is made at block 412 that the cardmember website does not have authorization, then at block 414 an exception from security system 218 is evoked and cardmember website 212 is not allowed to call web service 220. At block 416 an error message is then displayed to the cardmember.

If a determination is made at block 412 that the security checks made at block 410 have cleared, then at block 418, web service 220 is called. In turn, web service 220 retrieves the cardmember's eligibility data. At block 420, global merchant database 204 runs an eligibility check. The eligibility check may also include a check against the cardmember history, as shown in block 422 and at block 424, web service 220 returns the cardmember eligibility data to cardmember website 212. If a determination is made at block 426 that cardmember 216 is deemed ineligible, then at block 428, cardmember 216 is sent a message stating that their transaction account (i.e., card) is not eligible.

If a determination is made at block 426 that the cardmember's card is eligible, then at block 430 the cardmember website 212 performs a call to an email database for the cardmember's email address. Email database may be implemented in cardmember account database 208, global merchant database 204 or as a separate database.

If a determination is made at block 432 that an email for the cardmember is not available, then the cardmember's website displays a page to capture the cardmember's email address, as shown at block 434. In turn, cardmember 216 enters their email address in the web page displayed, as shown at block 438. If a determination is made at block 432 that an email is available for cardmember 216, then at block 436, cardmember website 212 stores the email address in the email database (e.g. cardmember account database 208 or global merchant database 204). Alternatively, if the cardmember was required to enter their email address in block 438, block 436 sends the cardmember email to the email database, where the email address is stored, as shown at block 437. At substantially the same time, at block 440, cardmember website 212 redirects to a Java access manager, which in turn makes a call to cardmember account database 208 for customer data, as shown at block 442. It should be understood that in this scenario a call is made to cardmember account database 208. However, as described above, this information can be pre-stored in global merchant database 204 as well.

At block 444, cardmember data system checks the cardmember's eligibility and responds with, for example, customer data and a zip code. Cardmember data system passes this information to cardmember website 212, which in turn passes the customer data to the Java access manager at block 446. The Java access manager packages the data and related security assertion markup language (SAML) data is sent to decisioning/orchestration unit 202.

Decisioning/orchestration unit 202 performs a check on the data and if a determination is made at block 450 that the correct data has not been provided, then at block 452, cardmember 216 is directed to another page to solve the technical problem. If a determination is made at block 450 that the correct data has been provided, then at block 454 a determination is made whether additional data is needed. If so, then at block 456, a request to cardmember 216 is made to enter additional data needed for enrollment with the merchant.

Decisioning/orchestration unit 202, at block 458, stores these additional data elements in global merchant database 204 (i.e., in a cardmember record 204b) and cardmember 216 is enrolled with the merchant for automatic bill payments as shown in block 460. If a determination was made at block 454 that no additional data was required, then the procedure jumps to block 460 as well. At substantially the same time, both the database of marketing system 210 and global merchant database 204 are updated to indicate that the cardmember has enrolled with a particular merchant for automatic bill payments.

In one embodiment, the card issuer can determine which customers are making non-automatic (i.e., non-recurring) payments to a particular merchant and request additional information from the merchant on those customers to populate cardmember data records for the particular merchant. Particularly, a predetermined amount of historical data is reviewed by a computer processor, for example, to determine which customers are pushing payments to the merchant. The card issuer then provides the merchant with a list of these customers to request additional information. Preferably, the communication to the merchant is through decisioning/orchestration unit 202.

In some cases, it may appear to the card issuer that the customer is set up with the merchant for automatic payments because, for example, the customer pays their bill every month on substantially the same day. Without additional information from the merchant, it is generally not possible to determine whether the customer is configured for automatic payments, particularly if the customer has not set up automatic payment services through the card issuer. This is because the card issuer only receives a transaction request from the merchant, and not information whether a customer is making the payment initiated by an automatic payment service of the merchant. Accordingly, by sharing its information, merchants 206 can indicate which cardmembers are setup for automatic bill payment when responding to a request for information from decisioning/orchestration unit 202.

In another embodiment, the merchant provides the card issuer with a list of customers and the card issuer determines whether the customers have a transaction account with them based on a comparison of the two lists. For example, the card issuer can match up customers and cardmembers by name and determine whether any of its cardmembers have accounts with the merchant.

Similarly, a comparison of a merchant customer list and a cardmember list can be used to determine whether a cardmember has been using another card to make automatic payments. This can implemented by, for example, including a field in the merchant list structure identifying whether the customer has set up automatic payments. If the card issuer system determines that few, sporadic, or no payments have been made using its card, a determination can be made that the cardmember is using another card. Other indicators can be used to determine whether the merchant customer is using another card as well, such as simply including the identifier of the card issuer the customer has been using to make payments.

The present invention (i.e., systems 100, 200 and processes 300 and 400 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In fact, in one embodiment, the invention is directed toward one or more computer systems capable of carrying out the functionality described herein. An example of a computer system 500 is shown in FIG. 5.

The computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
   storing, by a computer-based system for interfacing a merchant processor with a card issuer database, and in a global merchant database, a merchant profile that includes customer information;
   determining, by the computer-based system and based upon a transaction history of a customer, that the customer is making non-automatic payments to a merchant;
   requesting, by the computer-based system and from a merchant system, additional information about the customer;
   receiving, by the computer-based system, the additional information about the customer from the merchant system;
   storing, by the computer-based system, the additional information about the customer in the global merchant database; and
   notifying, by the computer-based system, a marketing system that the additional information about the customer is stored in the global merchant database.

2. The method of claim 1, wherein the request for additional information about the customer further comprises transmitting, by the computer-based system, the merchant profile to at least one of the merchant system and a cardmember database.

3. The method of claim 1, further comprising communicating, by the computer-based system, a notice to a the customer based on the determining that the customer is making non-automatic payments to the merchant, the notice providing instructions for configuring automatic bill payments.

4. The method of claim 3, wherein the notice provides at least one of a uniform resource locator (URL) and telephone number to call.

5. The method of claim 1, further comprising:
   receiving, by the computer-based system, a request to enroll the customer in an automatic payment plan associated with the merchant; and
   pushing, by the computer-based system, the customer information to the merchant system, wherein the customer information includes at least a portion of data required by the merchant system to complete a transaction request.

6. The method according to claim 1, further comprising:
   receiving, by the computer-based system and from the customer, via a user interface, additional data corresponding to the merchant profile; and
   storing, by the computer-based system, the additional data in the global merchant database.

7. A system comprising:
   a processor for interfacing a merchant processor with a card issuer database;
   a tangible, non-transitory memory configured to communicate with the processor,
   the tangible, non-transitory memory having instructions stored thereon that, in response to execution by the processor, cause the processor to perform operations comprising:
   storing, by the processor and in a global merchant database, a merchant profile that includes customer information;
   determining, by the processor and based upon a transaction history of a customer, that the customer is making non-automatic payments to a merchant; and
   requesting, by the processor and from a merchant system, additional information about the customer;
   receiving, by the processor, the additional information about the customer from the merchant system;
   storing, by the processor, the additional information about the customer in the global merchant database; and
   notifying, by the processor, a marketing system that the additional information about the customer is stored in the global merchant database.

8. The system of claim 7, further comprising transmitting, by the processor, the merchant profile to the merchant system and a cardmember database.

9. The system of claim 7, further comprising, communicating, by the processor, a notice to the customer based on the determining that the customer is making non-automatic payments to the merchant, the notice providing instructions for configuring automatic bill payments.

10. The system of claim 9, wherein the notice provides at least one of a uniform resource locator (URL) and telephone number to call.

11. The system of claim 7, further comprising communicating, by the processor, a notice to the customer, the notice providing instructions for configuring automatic bill payments.

12. The system of claim 11, wherein the notice provides at least one of a uniform resource locator (URL) and telephone number to call.

13. The system of claim 7, further comprising:
   receiving, by the processor, a request to enroll the customer in an automatic payment plan associated with the merchant; and
   pushing, by the processor, the customer information to the merchant system wherein the customer information includes at least a portion of data required by the merchant system to complete a transaction request.

14. The system of claim 7, further comprising:
   receiving, by the processor and from the customer, additional data corresponding to the merchant profile and storing, by the processor, the additional data in the global merchant database.

15. An article of manufacture including a non-transitory, tangible computer readable medium having instructions stored thereon that, in response to execution by a computer-based system for interfacing a merchant processor with a card issuer database, cause the computer-based system to perform operations comprising:

storing, by the computer-based system and in a global merchant database, a merchant profile that includes customer information;

determining, by the computer-based system and based upon a transaction history of a customer, that the customer is making non-automatic payments to a merchant;

requesting, by the computer-based system and from a merchant system, additional information about the customer;

receiving, by the computer-based system, the additional information about the customer data;

storing, by the computer-based system, the additional information about the customer in the global merchant database; and notifying, by the computer-based system, a marketing system that the additional information about the customer is stored in the global merchant database.

16. The article of claim 15, further comprising:

transmitting, by the computer-based system, the merchant profile to at least one of the merchant system and a cardmember database.

17. The article of claim 15, further comprising:

communicating, by the computer-based system, a notice to the customer based on the determining that the customer is making non-automatic payments to the merchant, the notice providing instructions for configuring automatic bill payments.

18. The article of claim 17, wherein the notice provides at least one of a uniform resource locator (URL) and telephone number to call.

19. The article of claim 15, further comprising:

receiving, by the computer-based system, a request to enroll the customer in an automatic payment plan associated with the merchant; and pushing, by the computer-based system, the customer information to the merchant system, wherein the data customer information includes at least a portion of data required by the merchant system to complete a transaction request.

20. The article of claim 15, further comprising:

receiving, by the computer-based system and from the customer, via a user interface, additional data corresponding to the merchant profile; and storing, by the computer-based system, the additional data in the global merchant database.

\* \* \* \* \*

UNITED STATES PATENT AND TRADEMARK OFFICE
CERTIFICATE OF CORRECTION

PATENT NO. : 8,150,754 B2
APPLICATION NO. : 12/342601
DATED : April 3, 2012
INVENTOR(S) : Lesley Leggatt et al.

It is certified that error appears in the above-identified patent and that said Letters Patent is hereby corrected as shown below:

IN THE CLAIMS:

In Column 13 Line 55, Claim 3, after "notice to" please delete "a".

In Column 15 Line 14, Claim 15, please delete "data".

In Column 16 Line 14, Claim 19, please delete "data".

Signed and Sealed this
Fifteenth Day of May, 2012

David J. Kappos
*Director of the United States Patent and Trademark Office*